United States Patent Office 3,258,480
Patented June 28, 1966

3,258,480
PREPARATION OF BIS(HYDROXYDIARYL-PHOSPHINE)DECABORANES
Hansjuergen A. Schroeder, New Haven, Conn., assignor to Olin Mathieson Chemical Corporation, a corporation of Virginia
No Drawing. Filed June 28, 1962, Ser. No. 205,860
10 Claims. (Cl. 260—500)

This invention relates to novel phosphorus-containing decaborane derivatives which are useful as intermediates in the preparation of high temperature resistant polymers. More particularly, this invention relates to a process for the preparation of bis(hydroxydiarylphosphine) decaboranes of the general formula:

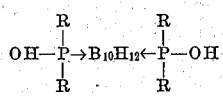

where R is an aryl or an alkaryl radical.

The bis(hydroxydiarylphosphine) decaboranes of this invention are prepared by reacting with a stoichiometric excess of water a bis(halodiarylphosphine) decaborane or a bis(halodialkarylphosphine) decarborane of the general formula:

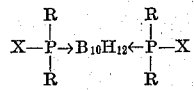

wherein X is a halogen and R is an aryl radical selected from the group consisting of phenyl, tolyl, xylyl, naphthyl, biphenylyl, or alkyl-substituted derivatives of the same aryl radicals, dissolved in an inert organic solvent which is miscible with water. It is surprising that water will react with the bis(halodiarylphosphine) decaboranes in the absence of a base to yield the hydroxy compound. Generally the reaction is carried out at ambient temperatures, preferably at room temperature, although temperatures of from about 10° C. to about 200° C. can be employed, if desired. In carrying out the reaction using certain water-miscible solvents such as ethyl acetate heating is necessary since the bis(halodiarylphosphine) decaboranes are insoluble in such solvents at room temperature. A stoichiometric excess of water is required in this novel hydrolysis reaction and, generally, from about 5 moles (250 percent of the stoichiometric requirement) to about 100 moles or more of water will be employed per mole of the bis(halodiarylphosphine) decaborane charged to the reactor. Depending upon the particular bis(halodiarylphosphine) decaborane utilized and the particular reaction conditions employed, the reaction will usually be completed in from about 0.05 hour to about 3 hours. The reaction product can be conveniently separated from the reaction mixture by a variety of methods including extraction, evaporation of the reaction mixture to dryness, etc. Ordinarily the reaction is carried out at atmospheric pressures although pressures varying from sub-atmospheric up to about 5 atmospheres or more may be employed, if desired.

The novel bis(hydroxydiarylphosphine) decaboranes prepared by the process of this invention are useful in the preparation of high temperature resistant polymers as described and claimed in Reiner and Schroeder application S.N. 205,862 filed of even date herewith, now Patent No. 3,141,856 of July 21, 1964. For example, if triethyl amine in benzene is added to an equimolar mixture of bis(chlorodiphenylphosphine) decaborane and bis(hydroxydiphenylphosphine) decaborane and the mixture heated to reflux a polymer having a molecular weight of about 27,000 is formed which is completely stable up to 270° C. When the polymer is heated above 270° C., hydrogen is given off although it does not soften at temperatures as high as 320° C. These valuable polymers are used for the preparation of a wide variety of products because of their excellent heat resistance and extreme resistance to solvent action. For example, such polymers can be incorporated into phenolformaldehyde plastics to increase the high temperature stability and solvent resistance of such products. In addition, these polymeric materials can be formed into films and are useful as protective coatings for metal parts in high temperature service.

Suitable water-miscible solvents for the process of this invention include acetone, ethyl acetate, acetonitrile, dioxane, etc. The bis(halodiarylphosphine) decaboranes utilized as starting materials in the process of this invention can be prepared by the process set forth in Heying and Schroeder application S.N. 205,859, filed of even date herewith, now Patent No. 3,203,984 of August 31, 1965. The compound bis(chlorodiphenylphosphine) decaborane is prepared, for example, by reacting a solution of diphenylchlorophosphine in ether with a solution of decaborane in ether for about 2 hours at 25° C. and recovering the resulting product from the reaction mixture. Other useful bis(halodiarylphosphine) decaboranes include bis(chlorodiisopropylphenylphosphine) decaborane, bis(chlorodinaphthylphosphine) decaborane, bis-(chlorodiethylnaphthylphosphine) decaborane, bis(chlorodibiphenylphosphine) decaborane, bis(chloroditolylphosphine) decaborane, bis(chlorodiisopropyltolylphosphine) decaborane, bis(chlorodi-n-butyltolylphosphine) decaborane, etc. and the corresponding bromine, iodine and fluorine derivatives.

The following examples illustrate specific embodiments of this invention and are not to be considered as limitative.

*Example I*

Bis(chlorodiphenylphosphine) decaborane (5.61 g., 0.01 mole) was dissolved at 40° C. in acetone (220 ml.). After cooling to 25° C., water (10 ml.) was added to the slightly yellow solution. Upon stirring for approximately 5 min., the solution turned colorless and was then evaporated to dryness. The residue (4.8 g., 91 percent of the theoretical quantity) consisted of bis(hydroxydiphenylphosphine) decaborane.

Calc'd for $C_{24}H_{34}B_{10}O_2P_2$: C, 54.93; H, 6.53; B, 20.62; P, 11.81. Found: C, 55.33; H, 6.78; B, 20.66; P, 11.60.

*Example II–V*

A number of additional experiments (Examples II–V) were carried out in the same manner as set forth in Example I. Data relating to these experiments are included in Table 1 which follows:

TABLE 1

| Example | Reactor Charge | | | Mixing Time (Min.) | Yield of Bis (Hydroxydi-phenylphos-phine) Deca-borane (Percent) |
|---|---|---|---|---|---|
| | Bis(Chlorodi-phenylphos-phine) Deca-borane (Grams) | Acetone (ml.) | Water (ml.) | | |
| II | 2 | 100 | 5 | 5 | 90 |
| III | 10 | 400 | 20 | 5 | 92 |
| IV | 10 | 800 | 40 | 5 | 91 |
| V | 10 | 800 | 40 | 5 | 93 |

*Example VI*

A mixture of bis(chlorodiphenylphosphine) decaborane (2 g.), ethyl acetate (120 ml.) and water (1 ml.) was heated to reflux until solution was effected the solution was allowed to stand at room temperature for 12 hours and was then evaporated to give 1.66 g. (89 percent of the theoretical quantity) of bis(hydroxydiphenylphosphine) decaborane.

Calc'd for $C_{24}H_{34}B_{10}O_2P_2$: C, 54.93; H, 6.53; B, 20.62; P, 11.81. Found: C, 54.77; H, 6.67; B, 20.72; P, 11.60.

*Example VII*

A mixture of bis(chlorodiphenylphosphine) decaborane (5 g.), acetonitrile (200 ml.) and water (2 ml.) was heated briefly to effect solution. After standing at room temperature for one hour, the reaction mixture was filtered. The resulting filtrate was evaporated to give a precipitate of 4.1 g. (87.5 percent of the theoretical quantity) of pure bis(hydroxydiphenylphosphine) decaborane which was identified by its melting point and infrared spectrum.

What is claimed is:

1. A process for the preparation of bis(hydroxydiarylphosphine) decaboranes of the formula:

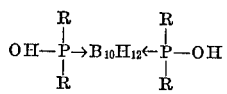

wherein R is an aryl radical selected from the group consisting of phenyl, tolyl, xylyl, naphthyl and biphenylyl, which consists in reacting with a stoichiometric excess of water a compound of the formula:

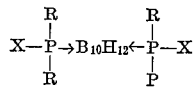

wherein X is a halogen and R is an aryl radical selected from the group consisting of phenyl, tolyl, xylyl, naphthyl, and biphenyl, said compound being dissolved in a water-miscible solvent.

2. The process of claim 1 wherein the reaction is effected at a temperature of about 10° C. to about 200° C.

3. The process of claim 1 wherein the said compound is bis(chlorodiphenylphosphine) decaborane.

4. The process of claim 3 wherein the said water-miscible solvent is acetone.

5. The process of claim 3 wherein the said water-miscible solvent is ethyl acetate.

6. The process of claim 3 wherein the said water-miscible solvent is acetonitrile.

7. The process for the preparation of bis(hydroxydiphenylphosphine) decaborane which consists in reacting bis(chlorodiphenyl phosphine) decaborane dissolved in a water-miscible solvent, with a stoichiometric excess of water, at a temperature between about 10° C. and about 200° C.

8. The process of claim 7 wherein the water-miscible solvent is acetone.

9. The process of claim 7 wherein the said water-miscible solvent is ethyl acetate.

10. The process of claim 7 wherein the said water-miscible solvent is acetonitrile.

References Cited by the Examiner

UNITED STATES PATENTS 2,772,308 11/1956 Jensen _____ 260—500 X
2,871,263 1/1959 Short _____ 260—500 X

OTHER REFERENCES

Miller, "Jour. Org. Chem.," vol. 24, pp. 2013–15 (1959).

Van Wazer, Phosphorous and Its Compounds, vol 1, pages 261–262.

LEON ZITVER, *Primary Examiner.*

D. P. CLARKE, *Assistant Examiner.*

UNITED STATES PATENT OFFICE
CERTIFICATE OF CORRECTION

Patent No. 3,258,480                                            June 28, 1966

Hansjuergen A. Schroeder

It is hereby certified that error appears in the above numbered patent requiring correction and that the said Letters Patent should read as corrected below.

Column 2, line 70, for "effected the" read -- effected. The --; column 3, lines 29 to 31, the formula should appear as shown below instead of as in the patent:

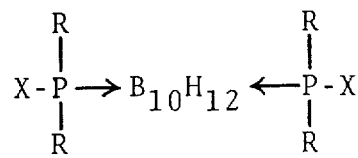

same column 3, line 36, for "biphenyl" read -- biphenylyl --.

Signed and sealed this 1st day of August 1967.

(SEAL)
Attest:

EDWARD M. FLETCHER, JR.                              EDWARD J. BRENNER
Attesting Officer                                     Commissioner of Patents